Figure 1:
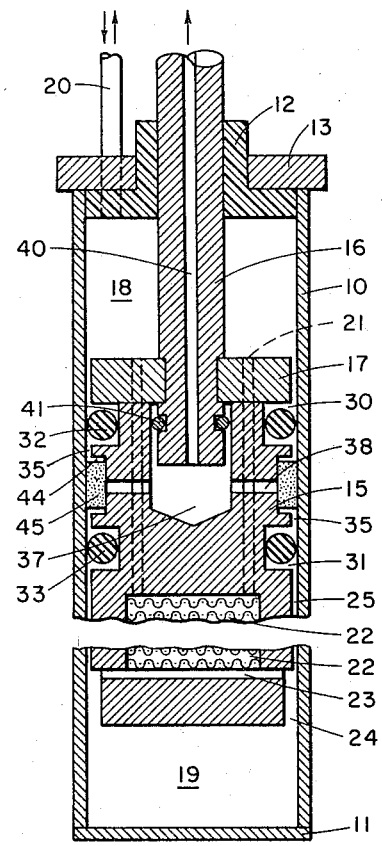

Feb. 14, 1967   F. F. CHELLIS   3,303,658
VENTED SEAL FOR AIR REFRIGERATOR
Filed Oct. 23, 1965

INVENTOR.
Fred F. Chellis
BY
Attorney

United States Patent Office 3,303,658
Patented Feb. 14, 1967

3,303,658
VENTED SEAL FOR AIR REFRIGERATOR
Fred F. Chellis, Manchester, Mass., assignor to Arthur D. Little, Inc., Cambridge, Mass., a corporation of Massachusetts
Filed Oct. 23, 1965, Ser. No. 503,726
7 Claims. (Cl. 62—6)

This invention relates to an improved seal and particularly to a seal adapted to isolate fluids in warm and cold chambers in a cryogenic refrigerator.

Recently there has been developed a new cryogenic refrigerator, the basic apparatus structure constituting a closed cylindrical body in which a displacer moves so as to define two or more fluid chambers of variable volume within the cylindrical body. As an example of such a device, I may cite a cryogenic refrigerator constructed in accordance with the teachings of U.S.P. 2,966,035, U.S.P. 3,188,818, or U.S.P. 3,188,819. In cryogenic refrigerators of the types described in these patents there is within a closed cylindrical housing a displacer which, in moving up and down, defines a "warm" and a "cold" chamber each of variable volume. The chambers are joined through a fluid path having a regenerator serving as a thermal storage means. Thus, the chambers are at essentially the same fluid pressure at all times, although they vary in volume. Since the two chambers are, however, at widely different temperatures, it is essential to be able to effectively isolate them so that no contaminants contained in the fluid reaches the cold chamber by leaking from the warm chamber around the piston. Such leakage within the cylinder into cold voids results in the freezing of contaminants such as moisture vapor, $CO_2$, methane and the lower hydrocarbons on the walls of the cylindrical housing, which in turn causes the displacer to jam and stop.

The sealing means of this invention prevents such freeze-up problems by providing a way for that portion of the fluid which would normally leak past the seal into the cold voids to be vented to the atmosphere.

It may be pointed out that the fluid reaching the cold chamber through the fluid path is freed of contaminants by first freezing them out in the regenerator as fluid is introduced into the cold chamber and vaporizing them and sweeping them out as fluid is withdrawn from the cold chamber.

It is therefore a primary object of this invention to provide an improved sealing means which is capable of effectively and completely isolating fluids in two separate chambers at the opposite ends of a displacer moving within a closed cylindrical housing. It is another object of this invention to provide a sealing means of the character described which is particularly suitable for isolating high-pressure fluids within a warm and a cold chamber within a common housing and preventing any intercommunication between the chambers. It is yet another object of this invention to provide such a sealing means which is particularly suitable for a cryogenic refrigerator to prevent any freezing of fluid contaminants which may leak fom the warm chamber, and hence to prevent any freeze-up of the refrigerator. Other objects of the invention will in part be obvious and will in part be apparent hereinafter.

The invention accordingly comprises the features of construction, combination of elements, and arrangement of parts which will be exemplified in the construction hereinafter set forth and the scope of the invention will be indicated in the claims.

Figure 2:
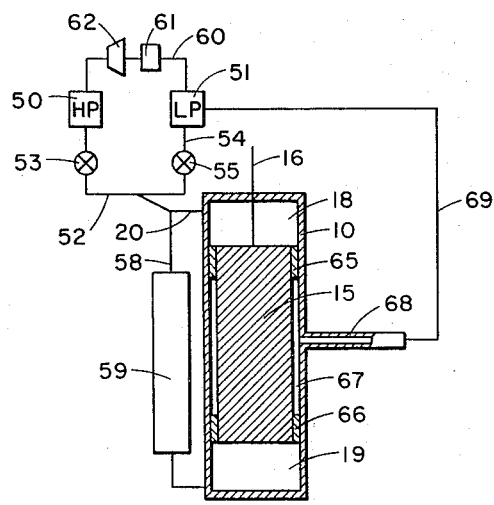

For a fuller understanding of the nature and objects of the invention, reference should be had to the following detailed description taken in connection with the accompanying drawing in which:

FIG. 1 is a detailed cross-section of one embodiment of the sealing means of this invention shown as incorporated in a cryogenic refrigerator; and FIG. 2 is a cross-section of another embodiment of the sealing means of this invention showing the remaining portion of the refrigeration apparatus in diagrammatic fashion.

In order to prevent high-pressure fluid which may be introduced into the refrigerator from being forced down though the normal seal which is effected between the top end of the displacer and the internal walls of the housing, the seal of this invention provides for a fluid leak path which, in effect, vents the high-pressure fluid and hence prevents it from leaking past the seal into the cold voids existing in the lower part of the refrigerator. Venting may be to the atmosphere in an open cycle such as would be used for example in a cryogenic refrigerator operated on shop air; or it may be to a low-pressure reservoir such as would be used for example in a closed cycle operating with helium.

In FIG. 1 the sealing means of this invention is illustrated in its application to a cryogenic refrigerator particularly suited for open cycle operation. Although the cryogenic refrigerator as such is not part of this invention, it is necessary to describe it in brief in order to illustrate the manner in which the sealing means is incorporated into the refrigerator. FIG. 1, therefore, shows a portion of the upper end of a cryogenic refrigerator and a portion of the lower end; there being no need to show the entire length of the displacer and of the cylindrical housing.

In FIG. 1 the cylindrical housing of the refrigerator 10 will be seen to be closed at the bottom with an end plate 11 and at the top with a bushing 12 and an annular sealing ring 13. Within the interior of the cylindrical housing 10 a displacer 15 is caused to reciprocate up and down and is attached at its upper end to a rod 16 through any suitable means such as ring 17. In its movement, the displacer defines an upper warm chamber 18 and a lower cold chamber 19, the volumes of which are, of course, determined by the position of the displacer. Communicating with the upper chamber is a suitable conduit 20 having valving means (not shown) which leads to a suitable connection with a high-pessure reservoir (e.g., shop air) and to a suitable connection with a low-pressure region (e.g., atmosphere). Periodically, high-pressure fluid is introduced into chamber 18 and periodically with the opening of a valve to the low-pressure side low-pressure fluid is withdrawn from chamber 18. The chambers 18 and 19 are connected through a fluid path which in its simplest form is shown in FIG. 1 to comprise two or more passages 21 which communicate with a regenator 22 which is located within the displacer 15. Regenerator 22 at its bottom end opens into a series of radial passages 23 which, in turn, communicate with an annular passage 24 defined by a smaller diameter section of the displacer and the internal walls of the cylindrical housing. The annular passage 24 leads directly into the lower cold chamber 19. It is preferable in a cryogenic refrigerator of this type to leave a small clearance 25 between the external wall of the main portion of the displacer 15 and the internal wall of the cylindrical housing 16. The advantage of this clearance is to minimize what may be referred to as "motional heat leak" brought about through the movement of the displacer. A heat leak may be present because the bottom end of the displacer is cold and it can be unnecessarily warmed by heat leaking to it from the wall of the cylindrical body which, at the point of the upper end of the displacer stroke, is considerably warmer than the displacer itself.

It will be appreciated that if any warm high-pressure fluid leaks down through the sealing means into the clearance 25, the contaminants in it can be frozen at the lower colder end of the refrigerator and lock or freeze the displacer to the wall. It is therefore the purpose of the sealing means of this invention to prevent any high-pressure warm fluid from leaking into the cold voids of this clearance 25.

In the modification shown in FIG. 1 the sealing means comprises in combination the two annular grooves 30 and 31 in the displacer wall and the sealing rings 32 and 33 which are located within these grooves and which make surface-to-surface contact with both the side walls of the groove and the internal wall of the cylindrical body 10. Sufficient clearance is left between the displacer and the internal wall of the housing to define an annular passage 35 which affords a fluid communication between the volumes of the two annular grooves 30 and 31. This annular passage is, in turn, in fluid communication with a small internal chamber 37 drilled in the top portion of the displacer. This fluid communication is by way of a series of radial passages 38. The chamber 37 is open to the ambient atmosphere through axial passage 40 which extends up through the displacer rod 16. A suitably sealing ring 41 may be provided to insure the complete sealing of the small chamber 37 from the warm variable volume chamber 18. If desired, there may be milled in the displacer surface an annular recess 44 between the two annular grooves 30 and 31 and in this may be located a felt lubrication ring 45 which is typically a piece of felt or other suitable fabric saturated with a lubricant. Such a lubrication ring is sufficiently porous to form part of the fluid path between the grooves 30 and 31 and the radial passages 38.

The sealing rings 32 and 33 may be formed of an elastomeric material, e.g., rubber, of a molded rubber, or of a suitable synthetic resin such as polytetrafluoroethylene. As will be shown in a further description of the sealing means, other types of seals may be used as well.

It will be seen from an examination of FIG. 1 that any high-pressure fluid in chamber 18 leaking through a single sealing ring corresponding in position to ring 32 would normally have a tendency to be forced into clearance 25 and finally be cooled sufficiently to freeze contaminants in it. However, in the sealing means of this invention it will be seen that any high-pressure fluid which leaks past sealing rings 32 and 33 will flow into chamber 37 by way of recess 44 and radial passages to be vented through axial passage 40. This venting is the result of the fluid pressure differential which exists in chamber 18 and 19 and the low-pressure side (ambient atmosphere) of the system.

With the prevention of any high-pressure fluid leak into clearance 25, there no longer exists the possibility of contaminants freezing and of slowing down or stopping the movement of the displacer.

FIG. 2 illustrates another embodiment of the sealing means of this invention, and shows how it may be applied to a closed cycle apparatus, for example, one in which helium is recycled. As in the case of FIG. 1, the movement of displacer 15 defines a warm chamber 18 and a cold chamber 19 within a cylindrical housing 10. It is necessary in a closed system to provide a high-pressure reservoir 50 which is in communication with the refrigerator through conduit 52 (controlled by valve 53) and a low-pressure reservoir 51 in communication with the system through conduit 54 (controlled by valve 55). Conduits 52 and 54 communicate with conduit 20 leading into the chamber 18 and with conduit 58 which forms a portion of the fluid path into chamber 19. In this fluid path 58 there is positioned a regenerator 59 which, in contrast to the regenerator 22 of FIG. 1, is external of the refrigerator. The low-pressure and high-pressure reservoirs are connected through a suitable fluid path 60 which will generally incorporate a suitable clean-up system 61 and a compressor 62. Thus, there is provided a completely closed system for the refrigerator.

In the embodiment shown in FIG. 2 the displacer has an upper sealing ring means 65 and a low sealing ring means 66. These may be split rings, a layer of sealing material such as leather, or an enlargement of the displacer diameter. Between the two sealing ring means is an annular passage 67, the dimensions of which are not shown to scale. At substantially the midpoint of annular passage 67 there is provided a vent 68 which through proper conduit means 69 leads directly to the low-pressure reservoir 51. It will be appreciated from the operation of the sealing means of this invention that the vent 68 must be so located that it is not closed by either of the sealing rings 65 and 66 during the motion of the displacer 15. Any fluid which leaks through the seals is returned in this system to the low-pressure side for recirculation within the cycle.

It is, of course, possible to employ the sealing means embodiment of FIG. 1 in a closed cycle and the embodiment of FIG. 2 in an open cycle. The actual fluid seal between the displacer surface and the cylindrical housing internal wall may be in the form of any known means for effecting a fluid seal. These include, but are not limited to, O-rings of any suitable material, piston rings, leather surfaces, and accurately machined and good fitting surfaces.

It is also within the scope of this invention to apply the sealing means to refrigerators having more than two chambers in which it is desirable to isolate each chamber. Normally, such refrigerators will have a single "warm" chamber and a series of successively colder chambers.

It will thus be seen that the objects set forth above, among those made apparent from the preceding description, are efficiently attained and since certain changes may be made in the above construction without departing from the scope of the invention it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. In a refrigerator in which a displacer is reciprocated within a cylindrical housing to define therein through the motion of said displacer two isolated chambers at widely different temperatures, a sealing means adapted to prevent fluid from leaking from the warmer chamber to cold voids in the refrigerator, said sealing means comprising
    (a) two parallel, spaced fluid seals between the surface of said displacer and the internal wall of said cylindrical body;
    (b) a narrow annular passage between said fluid seals defined between the surface of said displacer and said internal wall of said cylindrical body; and
    (c) fluid communication means between said annular passage and a low-pressure region.

2. A sealing means in accordance with claim 1 wherein said fluid seals are O-rings positioned within grooves in the surface of said displacer.

3. A sealing means in accordance with claim 2 further characterized by having an annular recess in said annular passage and a porous ring containing lubricant positioned in said recess.

4. A sealing means in accordance with claim 1 wherein said fluid seals are piston rings.

5. A sealing means in accordance with claim 1 wherein said fluid seals comprise enlarged diameter sections of said displacer, the external surfaces of said sections effecting said fluid seals with said internal wall of said cylindrical body.

6. A sealing means in accordance with claim 1 wherein said fluid communication means vents to the atmosphere and said refrigerator is an open cycle device.

7. A sealing means in accordance with claim 1 wherein said fluid communication means comprises a fluid connection between said annular passage and a low-pressure reservoir and said refrigerator is a closed cycle device.

References Cited by the Examiner
UNITED STATES PATENTS

| 2,943,453 | 5/1960 | Jonkers | 62—6 |
| 2,982,088 | 5/1961 | Meijer | 62—6 |
| 3,038,318 | 6/1962 | Hanny | 62—402 |
| 3,188,820 | 6/1965 | Hogan | 62—6 |

WILLIAM J. WYE, *Primary Examiner.*